Figure 1:
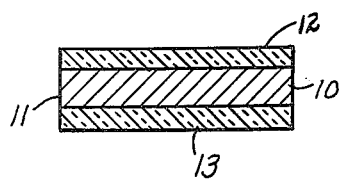

Feb. 9, 1954 P. ROBINSON 2,668,936
ELECTRICAL CONDENSER
Filed May 26, 1948

PRESTON ROBINSON
INVENTOR.

BY Arthur G. Connolly
his attorney

Patented Feb. 9, 1954

2,668,936

UNITED STATES PATENT OFFICE 2,668,936

ELECTRICAL CONDENSER

Preston Robinson, Williamstown, Mass., assignor to Sprague Electric Company, North Adams, Mass., a corporation of Massachusetts Application May 26, 1948, Serial No. 29,301

8 Claims. (Cl. 317—258)

1

My present invention relates to improved electrical condensers. More particularly, it concerns stacked and rolled condensers having a high electrical capacity per unit of volume. Rolled paper and stacked mica condensers can be made and are produced in large quantities at low cost. They are satisfactory for most applications in which a condenser is required. However, for some applications it is highly desirable or even necessary to provide a condenser having greater capacity per unit of volume, than can be achieved by these conventional types.

Rolled paper condensers generally employ electrode foils of about .0004" thickness. The insulation usually consists of two or three layers of paper of perhaps .0003" thickness each. In such condensers as well as in the stacked mica condensers a "margin" of at least .05", i. e. excess width and length of dielectric spacer, is employed, in order to reduce the possibility of breakdown between adjacent electrode foil edges. Such excess amounts of dielectric spacer material, of course tend to limit the efficiency of such condensers, i. e. their capacity per unit of volume. This makes it impossible to produce very small units of the conventional types having adequate capacity for most purposes.

Numerous attempts have been made to produce electrical condensers of high capacity and small volume by dipping electrode foils in waxes and lacquers to produce upon cooling or removal of the solvent, an insulated foil which can be wound or stacked with other foils to produce condensers without the use of the customary, separate, dielectric spacer sheets. These attempts have been unsuccessful, principally because of the difficulty in providing uniform insulation about the edges and at the corners of the coated foils.

The electrode foils employed in highly efficient condensers must necessarily be very thin and have sharp edges. When coating insulation upon such a thin foil, either by dipping the latter in a solution, emulsion or suspension of the insulating material, or by electrophoretic deposition of the insulating material, it is found that the coating does not form uniformly about the edges and at the corners of the foil. In most cases the insulation will "pull away" at these locations, leaving an exposed or a poorly insulated foil surface. Unfortunately, it is at the edges and corners of the electrode foil, that the field strength is at the highest, so that these are the locations where breakdown is most likely to occur. In the prior attempts to employ lacquer or wax coated electrode foils, the edge difficulties have made it impractical, if not impossible, to

2 produce small, rolled condensers with adequately insulated foil edges. If one insulates large strips of condenser foil and then punches electrode elements therefrom, in order to produce a stacked condenser, the difficulties of obtaining adequate insulation along the edges and at the corners are even greater.

It has also been attempted to insulate electrode foils with ceramic coatings. Sufficiently flexible ceramic coatings can be produced on electrode foils by electrophoretic deposition, combined with or followed by a treatment with a resin or other suitable binder. However, the difficulties in securing a uniform and durable coating along the edges and at the corners of the electrode foil are very great. Specially designed cathodes may be employed during electrophoresis to increase the deposition at the edges and corners of the foil, but such procedures are difficult to control properly. Of course, foils so insulated are subject to the same disadvantages as the lacquered and waxed foils, when the electrode elements are punched or cut from long strips in the production of stacked condensers.

It is an object of the present invention to overcome the foregoing and related disadvantages of the prior art condensers. A further object is to produce improved rolled and stacked electrostatic condensers. A still further object is to produce small electrical condensers of relatively high capacity. Another object is to provide a simple method for insulating the edges and corners of electrode elements in stacked and rolled electrical condensers.

These objects are attained in accordance with the invention by providing an electrical condenser comprising at least two cooperating electrode foils, at least one of which is composed of a film-forming metal and is insulated on its flat surfaces with a water-resistant dielectric material and on its edges with the electrolytically formed oxide of said metal. In a more restricted sense this invention is concerned with an electrical condenser comprising at least two thin, cooperating electrode foils, at least one of which consists of aluminum and is insulated on the flat surfaces thereof with a water-resistant electrolytically formed aluminum oxide. In one of its preferred embodiments the invention is concerned with an electrical condenser comprising two thin, convolutely wound, aluminum foils, the flat surfaces of at least one of said foils being insulated with a flexible, water-resistant dielectric material, and the edges and corners of said foils being insulated with electrolytically formed aluminum oxide. This invention is also concerned with a process for producing electrical condensers which comprises convolutely winding film-forming electrode foils, the flat surfaces of at least one of which are coated with a flexible, water-resistant, dielectric material, and thereafter forming an oxide film on the edges of said rolled foils in the presence of a film-forming electrolyte.

According to my invention I have found it possible to produce novel stacked and rolled condensers of the insulated foil type wherein the edges of the electrode foils are adequately insulated to provide a uniform and relatively high voltage breakdown. More particularly, I have found that it is possible to form an oxide film on the foil edges by electrolytic means when the foil is composed of a film-forming metal, despite the presence of insulation substantially covering the flat surfaces of the foil. By my process it is possible to produce electrostatic condensers having a high capacity per unit of volume without encountering the difficulties generally experienced with lacquered or otherwise insulated electrode foils. The temperature to which the foil need be subjected is relatively low, e. g., around 85° C., while the electrolyte used to form the oxide film does not cause the original insulation any appreciable damage.

Among the film-forming metals which may be used as the electrode material may be mentioned aluminum, tantalum, and titanium. I prefer to use aluminum, since it is extremely flexible and can be obtained in very thin sheets at relatively low cost. As a general rule the thickness of the electrode foil should be less than about .001" and preferably less than about .0005". It is with thicknesses of .0005" or less that my invention has its greatest utility since it is difficult to form, that is, provide an in situ formed oxide on, aluminum of this thickness. According to my invention it is possible to oxidize all exposed metal surfaces at the edges and corners of the aluminum foils, after assembly of the condenser elements, without danger of cracking or flaking off the formed oxide film. While the oxide film is generally very thin relative to other types of insulation, it has a high breakdown strength when properly prepared, and it is thus possible to eliminate the relatively wide margins conventionally employed in the manufacture of stacked and rolled electrostatic condensers. The aluminum is preferably of high purity, e. g. such as 99.85%.

The dielectric coating initially provided on the flat surfaces of the electrode foils may be organic or inorganic in nature, provided that it is resistant to the processing conditions met and the electrolyte used in the formation of the oxide film on the edges of the foil. Since the condensers of the invention have particular advantage and utility at temperatures above about 125° C., high temperature resistant dielectrics are desirable, although not required in the practice of the invention. Among the suitable organic dielectric materials are the polytetrahaloethylenes and copolymers of tetrahaloethylenes with other polymerizable materials; polypentachlorostyrene and its copolymers; polyamides; polyurethanes; various high temperature condensation resins, and the like. These may be applied to the electrode foil by solvent lacquers, in emulsions, by spraying and by electrophoresis from suspensions of ceramic particles, inorganic paints, etc. Also suitable are the hydrolysis products of the aryl-, alkyl- and aralkyl-chlor-silanes, which have become known technically as the silicones and polysiloxanes. These resins are usually deposited on the foil from a solution of the partially polymerized material.

The original dielectric coating preferably has a thickness of .0005" or less, in order that the maximum electrical capacity per unit of volume of the resulting condenser may be attained.

The coated foils are then processed, either before or after assembly into a condenser structure, to form the oxide film upon all exposed metal surfaces thereof, particularly at the edges and corners. This is accomplished by connecting the foil to a positive terminal of a source of electric current and placing the so-connected foil in a film-forming electrolyte having a cathode therein. When processing an already assembled condenser structure, both terminals of the unit may be connected to the positive energy source, so that all electrode foils serve as anodes in the resultant electrolytic cell.

The film-forming electrolyte consists of an ionogen, such as boric acid, oxalic acid and the like, dissolved in water or some other suitable liquid solvent.

For high voltage applications, I prefer to conduct the oxide formation in an ionogen solution with a pH greater than about 4.5. Representative ionogens for this purpose are boric acid and citric acid. The formation voltage may be on the order of 550 volts and the thickness of the film is determined by this voltage. The oxide film formed in this manner is dense, thin and adherent.

For low voltage applications, the oxide film may be formed in an ionogen solution possessing a pH less than about 4.5. Representative ionogens for this purpose are oxalic acid, sulfuric acid, succinic acid and chromic acid. The formation is usually conducted at about 10 to about 50 volts and low temperatures are satisfactory. The film thus formed is porous and its thickness is dependent largely upon the total electrical energy supplied.

The foil to be edge insulated is electrically connected as an anode and placed in the electrolyte bath at the proper formation voltage. When the oxide film has been formed to the proper state, the foil is removed, washed and dried. A wound or stacked condenser body may likewise be treated, one or all of the foils being connected as anodes in the process. An advantage of this treatment is that it will serve to correct any pin holes, cracks or like flaws that may be present in the original dielectric coating on the foil. Upon completion of the oxide film formation, the fully insulated foil or condenser unit is preferably washed with distilled water and carefully dried in an oven.

Reference is made for purposes of illustration to the appended drawing in which

Figure 2:
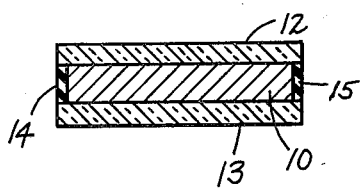
Figure 3:
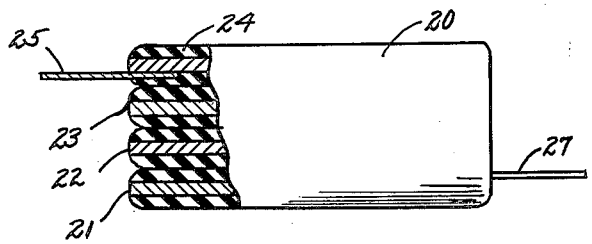
Figure 4:
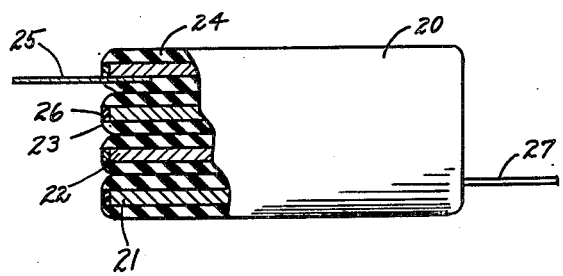

Figure 1 represents a cross-sectional view of a partially insulated, electrode foil, Figure 2 represents a cross-sectional view of the foil of Figure 1, after the edge insulation has been formed, Figure 3 represents a partial cross-section of a convolutely wound condenser assembly prior to insulation of the edges, and Figure 4 represents a partial cross-section of condenser of Figure 3, after it has been processed in accordance with the invention.

Referring more specifically to Figure 1, 10 represents a metal electrode foil, the flat surfaces of which are coated with insulation 12 and 13. The latter, represented in Figure 1 as inorganic, may be applied by any of the known methods, as discussed previously.

Likewise, large strips of foil may be coated with dielectric and subsequently punched or cut to form small strips or squares suitable for stacking or rolling into small condensers. The disadvantage of these methods of insulation lies in the fact that the edge 11 of conductor 10 is inadequately or not at all insulated. This may be attributed to the thinness of the foil (e. g., .0004″) and the surface tension effect, when the dielectric coating is applied by conventional means. While the edge of insulation 12 and 13 is shown as corresponding to edge 11 of foil 10, this is not necessarily the case, and, indeed, will probably occur only when the foil is punched or cut from larger strips.

Figure 2 shows the foil of Figure 1, after it has been provided with the edge insulation, in accordance with my invention. 14 and 15 represent the metal oxide film formed on the edge of the foil 10 by electrolytic action in a film-forming electrolyte.

Such an edge-insulated foil can be used to produce stacked or rolled condensers. If the operating voltage level is to be relatively high, the other and cooperating conductor may also be insulated in a similar manner. However, for many purposes, one insulated and one uninsulated foil may be used as electrodes, giving the maximum electrical capacity per unit of volume.

A typical stack-type construction might utilize aluminum foil of .0004″ thickness, coated on each flat surface with insulation such as a flexible, water-resistant, ceramic layer .00025″ thick, and a cooperating electrode foil of aluminum of about .00025″ thickness.

Figure 3 shows a rolled electrical condenser 20 in which 21 and 22 represent metal electrode foils, each coated on their flat surfaces with insulation 24. The latter may be inorganic or, as here shown, a thin layer of resinous material, such as a polytetrahaloethylene, a silicone resin or a high melting polyisocyanate or polyamide. The condenser section is wound, so that the two electrode foils 21 and 22 overlap completely, thus giving maximum capacity per width of foil. The edges, however, such as edge 23 of foil 21, are exposed for reasons heretofore mentioned. A terminal tab 25 is attached to foil 22 and a tab 27 attached to foil 21. These tabs may be of aluminum or other film forming metal.

Figure 4 shows the rolled condenser of Figure 3, after it has been subjected to the electrolytic treatment described above. The exposed edges of the electrode foils are now insulated by the film of metal oxide so formed, as is indicated by 26 on edge 23. If tabs 25 and 27 are of aluminum, they also will be provided with an oxide film. For this reason, it is possible to coat a portion of each with a wax or resin prior to the formation process. Thereafter the wax or resin may be removed.

The edge insulation of the invention is stable over the normal temperature range. It resists deterioration due to corrosive atmospheres and is flame-proof, being wholly inorganic in nature. These properties, in combination with the adherence obtained by following the instructions given herein, make the insulation and condensers of the invention useful over a wide range of temperatures and conditions without sacrificing the high volume efficiency achieved. The advantage in being able to treat a rolled or stacked condenser after assembly is of great value, since cracks or defects caused during assembly may be corrected.

As many widely different embodiments of this invention may be made without departing from the spirit and scope hereof, it is to be understood that the invention is not limited to the specific embodiments hereof except as defined in the appended claims.

I claim:

1. An electrostatic condenser of high volumetric efficiency comprising electrode foils of opposite polarity, each electrode having a thickness of less than 0.0005 inch, said foil surfaces being metal oxide-free and sandwiched between layers less than 0.005 inch thick of dielectric material, and said foils being superimposed substantially exactly over each other so that their edges are adjacent, at least one of the foils being of film-forming metal and having on its adjacent edges an in situ electrolytically-formed oxide of said film-forming metal.

2. An electrostatic condenser as defined by claim 1 wherein the two electrode foils are convolutely wound in insulated relationship to each other with the dielectric layer, and the film-forming metal is aluminum.

3. An electrostatic condenser as defined by claim 1 in which the dielectric material is a polytetrahaloethylene.

4. An electrostatic condenser as defined by claim 1 in which the dielectric material is a ceramic.

5. The combination as defined by claim 1 in which both electrode foils are of film-forming metal.

6. The combination as defined by claim 1 in which both electrode foils are of film-forming metal, and both have their edges coated with in situ electrolytically formed oxide.

7. The combination as defined by claim 1 in which the dielectric layer is in the form of a coating on one foil.

8. An electrostatic-rolled condenser having two elongated foils of opposite polarity each less than 0.0005 inch thick convolutely wound in insulated relationship to each other between layers of metal oxide-free dielectric material having a thickness of 0.0005 inch, said foils being substantially exactly aligned so that their long edges, at which during use the electric field between the foils tends to concentrate, are adjacent each other, at least one foil being of film-forming metal and having its long edges coated with an in situ electrolytically-formed layer of oxide.

PRESTON ROBINSON.

References Cited in the file of this patent

UNITED STATES PATENTS

| Number | Name | Date |
| --- | --- | --- |
| 1,846,844 | Clark | Feb. 23, 1932 |
| 2,214,876 | Clark | Sept. 17, 1940 |
| 2,222,195 | Elsey | Nov. 19, 1940 |
| 2,238,031 | Brennan | Apr. 15, 1941 |
| 2,296,616 | Koller | Sept. 22, 1942 |
| 2,374,449 | Mulcahy | Apr. 24, 1945 |
| 2,393,966 | Brennan | Feb. 9, 1946 |
| 2,408,790 | Mack | Oct. 8, 1946 |
| 2,408,910 | Burnham | Oct. 8, 1946 |
| 2,421,652 | Robinson | June 3, 1947 |
| 2,447,386 | Antonoff | Aug. 17, 1948 |

FOREIGN PATENTS

| Number | Country | Date |
| --- | --- | --- |
| 474,063 | Great Britain | Jan. 17, 1936 |
| 584,351 | Great Britain | Jan. 24, 1947 |